United States Patent
Rao et al.

(10) Patent No.: US 9,026,832 B2
(45) Date of Patent: May 5, 2015

(54) METHOD, SYSTEM AND DEVICE FOR REMOVING MEDIA ACCESS CONTROL ADDRESSES

(75) Inventors: Junyang Rao, Nanjing (CN); Rongguo Hu, Nanjing (CN); Aimin Peng, Nanjing (CN); Kai Feng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 420 days.

(21) Appl. No.: 13/556,718

(22) Filed: Jul. 24, 2012

(65) Prior Publication Data
US 2013/0076396 A1 Mar. 28, 2013

(30) Foreign Application Priority Data
Sep. 26, 2011 (CN) .......................... 2011 1 0289023

(51) Int. Cl.
*G06F 1/04* (2006.01)
*H04L 7/033* (2006.01)

(52) U.S. Cl.
CPC ................ *H04L 7/0338* (2013.01); *G06F 1/04* (2013.01)

(58) Field of Classification Search
CPC .......... G06F 1/04; H04L 7/033; H04L 7/0338
USPC .................................................. 713/503, 600
See application file for complete search history.

(56) References Cited

U.S. PATENT DOCUMENTS

| | | | |
|---|---|---|---|
| 4,339,823 A | 7/1982 | Predina et al. | |
| 5,689,533 A | 11/1997 | Brauns et al. | |
| 6,263,034 B1 | 7/2001 | Kanack et al. | |
| 6,553,505 B1 | 4/2003 | Brown et al. | |
| 6,751,745 B1 | 6/2004 | Yoshimura et al. | |
| 6,861,886 B1 | 3/2005 | Ludden et al. | |
| 6,990,597 B2* | 1/2006 | Abe et al. ...................... | 713/500 |
| 7,848,474 B2 | 12/2010 | Cramm et al. | |
| 2002/0047738 A1* | 4/2002 | Kamihara ...................... | 327/237 |
| 2004/0165679 A1 | 8/2004 | Kwak | |
| 2008/0069278 A1 | 3/2008 | Baumgartner et al. | |
| 2009/0016477 A1 | 1/2009 | Cramm et al. | |
| 2009/0252265 A1 | 10/2009 | Xia et al. | |
| 2009/0290071 A1 | 11/2009 | Feng | |

FOREIGN PATENT DOCUMENTS

| | | |
|---|---|---|
| CN | 1126331 A | 7/1996 |
| CN | 1540912 A | 10/2004 |
| EP | 0500263 A2 | 8/1992 |

\* cited by examiner

*Primary Examiner* — Thuan Du
(74) *Attorney, Agent, or Firm* — Brinks Gilson & Lione

(57) ABSTRACT

Embodiments of the present invention disclose a method and device for selecting a sampling clock signal. The method includes: obtaining, by a logic chip, a data edge of a data signal and a clock edge of a clock signal, selecting a sampling edge according to the data edge and the clock edge, and sending a selecting signal corresponding to the sampling edge to a selector; and selecting, by the selector, a sampling clock signal according to the selecting signal. The technical solutions provided by the embodiments of the present invention can solve problems of poor system maintainability and high cost of operation and maintenance because a receiver device needs to select a sampling clock signal through manual configuration in the synchronous serial-port communication in the prior art.

6 Claims, 2 Drawing Sheets

METHOD, SYSTEM AND DEVICE FOR REMOVING MEDIA ACCESS CONTROL ADDRESSES

CROSS-REFERENCE TO RELATED APPLICATION

This application claims priority to Chinese Patent Application No. 201110289023.5, filed on Sep. 26, 2011, which is hereby incorporated by reference in its entirety.

FIELD

The present invention relates to the field of network communications, and in particular, to a method and device for selecting a sampling clock signal.

BACKGROUND

In synchronous serial-port communication, a transmitter device sends a clock signal and a data signal simultaneously, and a receiver device samples data according to the clock signal.

In actual engineering applications, due to factors such as the length of the cable from the transmitter device to the receiver device and intra-board wiring, delay of the data signal may be inconsistent with delay of the clock signal. However, in data sampling, requirements of setup time and hold time must be satisfied simultaneously, and if any requirement is not satisfied, the data obtained by sampling may be incorrect. Setup time refers to a minimum period during which the data signal must keep stable before the sampling edge, and hold time refers to a minimum period during which the data signal must keep stable after the sampling edge. Therefore, the following case may exist at the receiver device: The rising edge of the clock signal must be used as the sampling edge for sampling data, or the falling edge of the clock signal must be used as the sampling edge for sampling data.

Generally, a receiver of the receiver device uses a fixed clock edge to sample the data signal. Therefore, a selecting signal needs to be provided for a selector according to the selected sampling edge, so that the selector selects the original clock signal or the clock signal inverted by an inverter (also called a NOT gate) as a sampling clock signal and provides the sampling clock signal for the receiver. Specifically, if the clock edge for sampling data by the receiver of the receiver device is the same as the selected sampling edge, the original clock signal is selected as the sampling clock signal; and if the clock edge for sampling data by the receiver of the receiver device is different from the selected sampling edge, the clock signal inverted by the inverter is selected as the sampling clock signal.

In synchronous serial-port communication in the prior art, a selecting signal is input to the selector by manually configuring the sampling edge, so that the selector selects a sampling clock signal. Generally, a configuration personnel does not know which clock edge should be configured for sampling, and can determine the sampling edge only by attempts. For example, first the clock edge for sampling data by the receiver is configured manually as the rising edge, and a corresponding selecting signal is input to the selector, for example, 1, so that the selector selects a sampling clock signal for the receiver according to the selecting signal; then packet loss and bit error rate of the device are observed manually for a period; and if no packet loss and bit error occurs, the configured sampling edge does not need to be adjusted; while if packet loss or bit error is found, the clock edge for sampling data by the receiver is configured manually as the falling edge, and a corresponding selecting signal is input to the selector, so that the selector selects a sampling clock signal for the receiver according to the selecting signal. As a result, the system maintainability is poor and the cost of operation and maintenance is high.

SUMMARY

Embodiments of the present invention provide a method and device for selecting a sampling clock signal, in order to solve problems of poor system maintainability and high cost of operation and maintenance because the receiver device needs to select a sampling clock signal through manual configuration in the synchronous serial-port communication in the prior art.

According to one aspect of the present invention, the present invention provides a method for selecting a sampling clock signal. The method for selecting a sampling clock signal is applied to a receiver device, where the receiver device includes a logic chip and a selector, and the logic chip is connected to the selector.

The method for selecting a sampling clock signal includes:

obtaining, by the logic chip, a data edge of a data signal and a clock edge of a clock signal, selecting a sampling edge according to the data edge and the clock edge, and sending a selecting signal corresponding to the sampling edge to the selector; and selecting, by the selector, a sampling clock signal according to the selecting signal.

According to another aspect of the present invention, the present invention provides a receiver device, including a logic chip and a selector, where:

the logic chip is connected to the selector;

the logic chip is configured to obtain a data edge of a data signal and a clock edge of a clock signal, select a sampling edge according to the data edge and the clock edge, and send a selecting signal corresponding to the sampling edge to the selector; and the selector is configured to select a sampling clock signal according to the selecting signal.

With the technical solutions provided by embodiments of the present invention, the sampling edge can be automatically selected by detecting relative position of the data edge and, the clock edge by the logic chip. Thereby, the sampling clock signal is selected without manual configuration, the cost of operation and maintenance is reduced, and the system maintainability is improved.

DETAILED DESCRIPTION OF THE EMBODIMENTS

Figure 1:
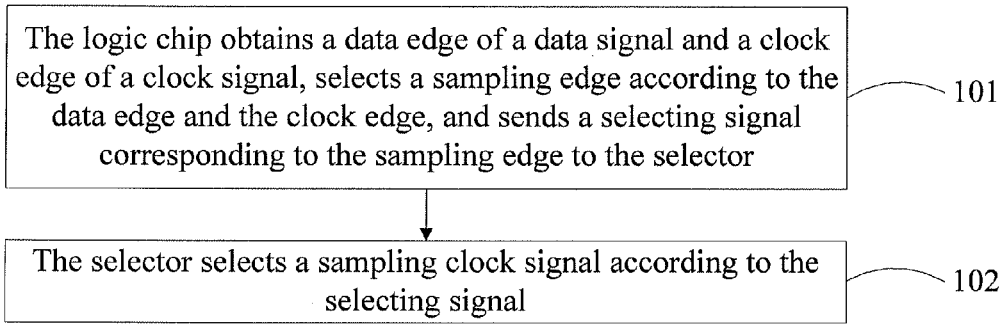
FIG. 1 is a flowchart of a method for selecting a sampling clock signal according to an embodiment of the present invention.

FIG. 1 is a flowchart of a method for selecting a sampling clock signal according to an embodiment of the present invention. The method for selecting a sampling clock signal is applied to a receiver device, where the receiver device includes a logic chip and a selector, and the logic chip is connected to the selector. The method for selecting a sampling clock signal includes the following:

101. The logic chip obtains a data edge of a data signal and a clock edge of a clock signal, selects a sampling edge according to the data edge and the clock edge, and sends a selecting signal corresponding to the sampling edge to the selector.

The receiver device may be a data terminal equipment (Data Terminal Equipment, DTE for short) or a data communication equipment (Data Communication Equipment, DCE for short).

The logic chip may be a complex programmable logic device (Complex Programmable Logic Device, CPLD for short), a field-programmable gate array (Field-Programmable Gate Array, FPGA for short), or an application specific integrated circuit (Application Specific Integrated Circuit, ASIC for short) used for selecting a sampling edge, and so on.

The receiver device may further include a receive data line RXD and a receive clock line RXC. The logic chip is connected to the RXD and the RXC respectively.

The logic chip obtains the data signal from the RXD and obtains the clock signal from the RXC. Then the logic chip samples the data signal and the clock signal by using a high-frequency clock signal, and obtains the data edge of the data signal and the clock edge of the clock signal.

The logic chip selects the sampling edge according to the data edge and the clock edge. Specifically, the logic chip detects relative position of the data edge and the clock edge, and selects a rising edge or a falling edge nearest to a middle position of a data pulse from the clock edge as the sampling edge to ensure setup time and hold time.

Figure 2:
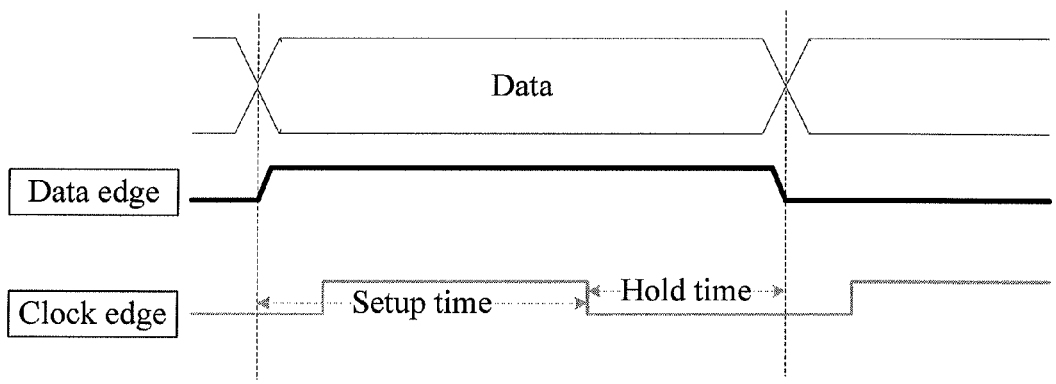
FIG. 2 is a schematic diagram illustrating relative position of a data edge of a data signal and a clock edge of a clock signal according to an embodiment of the present invention.

For example, FIG. 2 is a schematic diagram illustrating relative position of a data edge of a data signal and a clock edge of a clock signal received by the receiver device. If the rising edge of the clock signal is selected for sampling data, setup time is short and the sampled data may be incorrect; while if the falling edge of the clock signal nearer to the middle position of the data pulse is selected for sampling data, both setup time and hold time can be ensured.

After selecting the rising edge or falling edge of the clock signal as the sampling edge, the logic chip sends the selecting signal corresponding to the sampling edge to the selector. For example, 1 indicates the rising edge, and 0 indicates the falling edge; or a high level indicates the rising edge, and a low level indicates the falling edge, and so on.

102. The selector selects a sampling clock signal according to the selecting signal.

Generally, the selector is a 2-to-1 selector.

The selector selects the clock signal or an inverted clock signal as the sampling clock signal according to the selecting signal. Specifically, the selector is connected to the RXC, and is also connected to the RXC through an inverter. The selector obtains the clock signal from the RXC, and obtains the inverted clock signal from the inverter.

Optionally, the receiver device may further include a receiver, where the receiver is connected to the RXD and the selector respectively.

Further optionally, the receiver obtains the sampling clock signal from the selector, and samples the data signal according to the sampling clock signal.

In the embodiment of the present invention, the sampling edge can be automatically selected by detecting relative position of the data edge and the clock edge by the logic chip to obtain the sampling clock signal. Thereby, the cost of operation and maintenance is reduced and the system maintainability is improved. The embodiment solves problems of poor system maintainability and high cost of operation and maintenance because the receiver device needs to select a sampling clock signal through manual configuration in the synchronous serial-port communication in the prior art.

Figure 3:
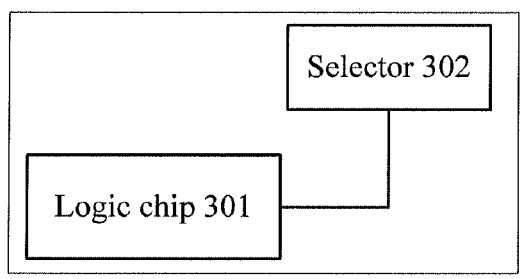
FIG. 3, FIG. 4, and FIG. 5 are block diagrams of a receiver device according to an embodiment of the present invention.

FIG. 3 is a block diagram of a receiver device according to an embodiment of the present invention, where the receiver device includes a logic chip 301 and a selector 302.

The logic chip 301 is connected to the selector 302.

The logic chip 301 is configured to obtain a data edge of a data signal and a clock edge of a clock signal, select a sampling edge according to the data edge and the clock edge, and send a selecting signal corresponding to the sampling edge to the selector 302.

The selector 302 is configured to select a sampling clock signal according to the selecting signal.

The receiver device may be a data terminal equipment DTE or a data communication equipment DCE.

The logic chip 301 may be a complex programmable logic device CPLD, a field-programmable gate array FPGA, or an application specific integrated circuit ASIC used for selecting a sampling edge, and so on.

Figure 4:
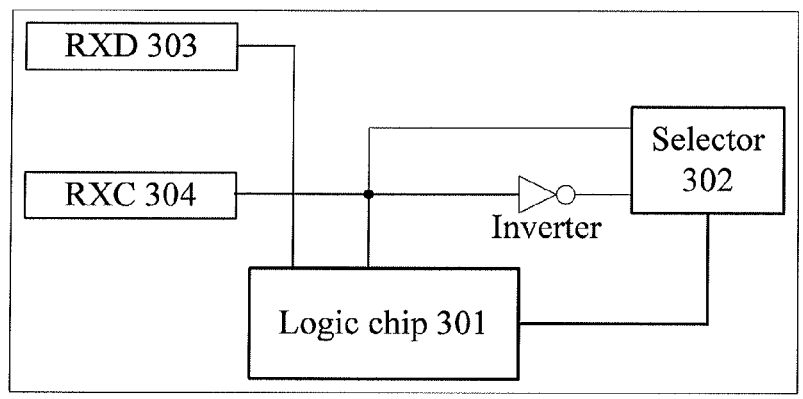

As shown in FIG. 4, the receiver device may further include a receive data line RXD 303 and a receive clock line RXC 304. The logic chip is connected to the RXD 303 and the RXC 304 respectively. The logic chip 301 is further configured to obtain the data signal from the RXD 303 and obtain the clock signal from the RXC 304.

Specifically, the logic chip 301 samples the data signal and the clock signal by using a high-frequency clock signal, obtains the data edge of the data signal and the clock edge of the clock signal, detects relative position of the data edge and the clock edge, and selects a rising edge or a falling edge nearest to a middle position of a data pulse from the clock edge as the sampling edge to ensure setup time and hold time. Then the logic chip 301 sends the selecting signal corresponding to the sampling edge to the selector 302. For example, 1 indicates the rising edge, and 0 indicates the falling edge; or a high level indicates the rising edge, and a low level indicates the falling edge, and so on.

The selector 302 is specifically configured to select the clock signal or an inverted clock signal as the sampling clock signal according to the selecting signal.

Specifically, as shown in FIG. 4, the selector 302 is connected to the RXC 304, and is also connected to the RXC 304 through an inverter. The selector 302 obtains the clock signal from the RXC 304, and obtains the inverted clock signal from the inverter.

Figure 5:
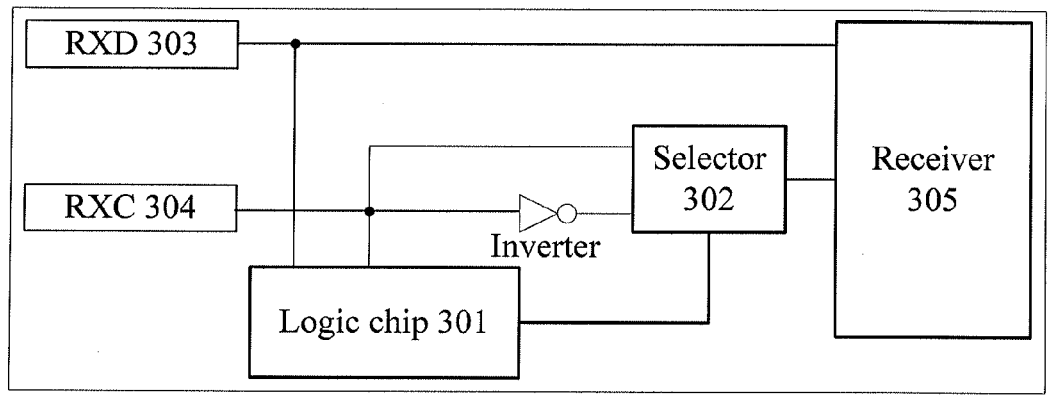

As shown in FIG. 5, the receiver device may further include:

a receiver 305, connected to the RXD 303 and the selector 302 respectively.

The receiver 305 is configured to obtain the sampling clock signal from the selector 302, obtain the data signal from the RXD 303, and sample the data signal according to the sampling clock signal.

With the technical solution provided by the embodiment of the present invention, the sampling edge can be automatically selected by detecting relative position of the data edge and the clock edge by the logic chip to obtain the sampling clock signal. Thereby, the cost of operation and maintenance is reduced and the system maintainability is improved. The embodiment solves problems of poor system maintainability and high cost of operation and maintenance because the receiver device needs to select a sampling clock signal through manual configuration in the synchronous serial-port communication in the prior art.

It is understandable to a person of ordinary skill in the art that all or a part of the steps in the methods provided in the preceding embodiments may be performed by hardware instructed by a program. The program may be stored in a computer readable storage medium, such as a ROM/RAM, a magnetic disk, or a compact disc-read only memory.

Detailed above are only exemplary embodiments of the present invention, but the scope of the present invention is not limited thereto. Any modification or substitution readily conceivable by a person skilled in the art within the scope of the technology disclosed herein shall be covered within the scope of the present invention.

What is claimed is:

1. A method for selecting a sampling clock signal, wherein the method is applied to a receiver device, the receiver device comprising a logic chip, a selector, a receive data line RXD and a receive clock line RXC, wherein the logic chip is connected to the selector, and wherein the logic chip is connected to the RXD and the RXC respectively; the selector is a 2-to-1 selector, and the selector is connected to the RXC through an inverter; wherein the method for selecting a sampling clock signal comprises:

obtaining, by the logic chip, a data signal from the RXD and a clock signal from the RXC;

obtaining, by the logic chip, a data edge of the data signal and a clock edge of the clock signal, selecting a rising edge or a falling edge nearest to a middle position of a data pulse from the clock edge as a sampling edge by detecting only once, relative position of the data edge and the clock edge, and sending a selecting signal corresponding to the sampling edge to the selector; and selecting, by the selector, the clock signal obtained from the RXC or an inverted clock signal obtained from the inverter as a sampling clock signal according to the selecting signal.

2. The method according to claim 1, wherein the obtaining, by the logic chip, the data edge of the data signal and the clock edge of the clock signal specifically comprises:

sampling, by the logic chip, the data signal and the clock signal by using a high-frequency clock signal, and obtaining the data edge of the data signal and the clock edge of the clock signal.

3. The method according to claim 1, further comprising:

obtaining, by a receiver, the sampling clock signal from the selector; and sampling the data signal according to the sampling clock signal.

4. A receiver device, comprising a logic chip, a receive data line RXD, a receive clock line RXC, an inverter and a selector, wherein the logic chip is connected to the selector;

the logic chip is connected to the RXD and the RXC respectively;

the selector is a 2-to-1 selector, the selector is connected to the RXC through the inverter;

the logic chip is configured to obtain a data signal from the RXD and a clock signal from the RXC, obtain a data edge of the data signal and a clock edge of the clock signal, select a rising edge or a falling edge nearest to a middle position of a data pulse from the clock edge as a sampling edge by detecting only once, relative position of the data edge and the clock edge, and send a selecting signal corresponding to the sampling edge to the selector; and the selector is configured to select the clock signal obtained from the RXC or an inverted clock signal obtained from the inverter as a sampling clock signal according to the selecting signal.

5. The receiver device according to claim 4, further comprising a receiver, wherein the receiver is connected to the RXD and the selector; and the receiver is configured to obtain the sampling clock signal from the selector, obtain the data signal from the RXD, and sample the data signal according to the sampling clock signal.

6. The receiver device according to claim 4, wherein the logic chip is configured to sample the data signal and the clock signal by using a high-frequency clock signal.

* * * * *